United States Patent [19]

Tanaka et al.

[11] Patent Number: 4,485,302
[45] Date of Patent: * Nov. 27, 1984

[54] RADIATION IMAGE READ OUT DEVICE

[75] Inventors: Kazuyoshi Tanaka; Hisatoyo Kato; Seiji Matsumoto, all of Minami-ashigara, Japan

[73] Assignee: Fuji Photo Film Co., Ltd., Japan

[*] Notice: The portion of the term of this patent subsequent to Aug. 24, 1999 has been disclaimed.

[21] Appl. No.: 325,930

[22] Filed: Nov. 30, 1981

Related U.S. Application Data

[62] Division of Ser. No. 105,240, Dec. 19, 1979, Pat. No. 4,346,295.

[30] Foreign Application Priority Data

Dec. 26, 1978 [JP] Japan ................. 53-163572
Jul. 11, 1979 [JP] Japan ................. 54-87806
Jul. 11, 1979 [JP] Japan ................. 54-87807
Jul. 11, 1979 [JP] Japan ................. 54-87808

[51] Int. Cl.$^3$ .................... G03C 5/16; G02B 5/14
[52] U.S. Cl. .................... 250/327.2; 250/484.1; 350/96.1
[58] Field of Search ........... 358/200, 901; 250/566, 250/227, 327.2, 271, 372, 458.1, 459.1, 461.1, 461.2, 484.1; 350/96.1, 96.24

[56] References Cited

U.S. PATENT DOCUMENTS

2,855,539 10/1958 Hoover, Jr. ................. 250/566
3,255,357 6/1966 Kapany et al. ............. 250/227
3,327,287 6/1967 Ball et al. ................. 350/96.24
3,859,527 1/1975 Luckey ................... 250/327.2
4,091,284 5/1978 Yamamoto et al. ............ 250/337
4,119,381 10/1978 Muka et al. ............... 250/227
4,127,773 11/1978 West ..................... 250/461.1

OTHER PUBLICATIONS

Broecker et al., "Demonstration of Cathodoluminescence in Fluorescein Marked Biological Tissues", Scanning Electron Microscopy/1975 (Part I), Proc. Eighth Ann. Scanning Electron Microscope Sym., Chicago, Apr. 1975, pp. 243-249.

*Primary Examiner*—Janice A. Howell
*Assistant Examiner*—Carolyn E. Fields
*Attorney, Agent, or Firm*—Gerald J. Ferguson, Jr.; Joseph J. Baker

[57] ABSTRACT

A radiation image recorded in a stimulable phosphor is read out by stimulating the phosphor with a stimulating ray to have the phosphor emit light and detecting the emitted light with a photodetector. A radiation image information thus obtained is read out by a photodetector by way of a light guide member which collects the light emitted by the phosphor and guides the collected light to a photodetector. The light guide member is made of a transparent sheet having smooth surfaces for effecting total reflection. The light guide member has a linear or arcuate end to be located adjacent to a scan line of the stimulable phosphor to receive and guide the light emitted by the phosphor and an annular end to be located adjacent to the light receiving face of the photodetector. The light entering the light guide member through the flat end is guided to the annular end by repeated total reflection.

11 Claims, 14 Drawing Figures

RADIATION IMAGE READ OUT DEVICE

This is a division of application Ser. No. 105,240, filed Dec. 19, 1979, now U.S. Pat. No. 4,346,295, issued Aug. 24, 1982.

BACKGROUND OF THE INVENTION

1. Field of the Invention

This invention relates to a radiation image read-out device for reading out the image information recorded in a stimulable phosphor by stimulating the same and measuring the light emitted therefrom upon stimulation, and more particularly to a device for reading out the diagnostic radiographic image information recorded in a stimulable phosphor which is able to store radiation energy and emits the stored energy upon stimulation by stimulating rays.

2. Description of the Prior Art

A stimulable phosphor stores a part of the energy of a radiation when it is exposed to the radiation like X-rays, α-rays, β-rays, γ-rays, ultraviolet rays and so forth. Then, upon stimulation thereof by stimulating rays the stimulable phosphor emits light the amount of which corresponds to the amount of energy stored therein.

It is known in the art to utilize the stimulable phosphor to once record an X-ray image of a human body or the like in a stimulable phosphor sheet, read out the recorded image with a photodetector by scanning the phosphor sheet by means of a laser beam or the like which stimulates the phosphor, and record the X-ray image on a recording medium like a photosensitive film by use of a recording light beam which is modulated by the image information read out by the photodetector. One of such devices is disclosed in U.S. Pat. No. 3,859,527.

In said patent a large mirror is used to reflect light emitted from a stimulable phosphor towards a photodetector. As the mirror is used a semi-transparent mirror which partly transmits the stimulating rays impinging upon the stimulable phosphor. The light emitted from the phosphor upon stimulation is partly reflected by the semi-transparent mirror which is inclined at 45° with respect to the optical path of the stimulating rays and is accordingly directed in parallel to the surface of the phosphor. The reflected light is received and measured by a photodetector by way of a condenser lens.

The above described device has a disadvantage that the quality of the radiation image information useful for diagnosis is very poor. This is because the light emitted from the stimulable phosphor upon stimulation diverges to all directions and accordingly the very limited fraction of the light is sensed by the photodetector. This situation reduce badly the S/N ratio of the image. Particularly because it is impossible from the viewpoint of safety to expose the human body to a radiation of large dose, the amount of light emitted from the stimulable phosphor which is in proportion to the amount of radiation energy stored therein is inevitably small. Therefore, in order to read out the radiation image information with a high S/N ratio enough for diagnosis, it is necessary to prevent the stimulating rays from impinging upon the photodetector at first, and secondly to introduce as much light emitted from the phosphor as possible into the photodetector. In the above described device disclosed in said U.S. Patent, however, there is no specific solution of this problem and accordingly it is impossible to get the radiation image information which is practically useful for diagnosis.

In order to solve the above problem and improve the radiation image information read out device of this type, the instant inventors have suggested a method of enhancing the S/N ratio by selectively detecting only the light emitted from the phosphor. This was conducted by making the wavelength of the stimulating rays differ from that of the light emitted from the phosphor and using a light detecting means which only detects the light of the wavelength of the latter. As the light detecting means can be used for instance a photodetector which is only sensitive to the light of said wavelength or a filter located in front of the photodetector which only transmits the light of said wavelength. For instance, as the stimulating rays is used a red laser beam having a wavelength distribution in the range of 600 to 700 nm which is different from the wavelength of the light emitted from the phosphor that is 300 to 500 nm. The above suggestion made by the instant inventors is disclosed in a copending Japanese patent application No. 53(1978)-84741, corresponding to U.S. Pat. No. 4,258,264.

Further, it was also suggested by the instant inventors that a photodetector is located extremely close to the phosphor in order to enhance the light collection efficiency (Japanese patent application No. 53(1978)-122881). This method is, however, disadvantageous in that the scanning mechanism of the stimulating rays becomes complex.

Thus, it has still been very difficult to obtain the radiation image information which is practically useful for diagnosis.

SUMMARY OF THE INVENTION

The primary object of the present invention is, therefore, to provide a radiation image information read out device having high light collecting efficiency.

Another object of the present invention is to provide accordingly a radiation image information read out device which has a high S/N ratio.

Still another object of the present invention is accordingly to provide a radiation image information read out device which is capable of obtaining the radiation image information that is practically useful for diagnosis.

The above objects of the present invention are accomplished by providing a particular light transmitting means between the photodetector and the stimulable phosphor to effectively collect the emitted light and introduce the same into the photodetector. The particular light transmitting means has such a shape that one end thereof extends along the scan line of a stimulable phosphor plate and the other end thereof is formed to match the light receiving face of the photodetector. The light emitted from the phosphor is effectively collected by the light transmitting means and is further effectively introduced into the photodetector by the same which is positioned so that the respective ends are in face to face engagement with said phosphor and photodetector.

DETAILED DESCRIPTION OF THE INVENTION

The present invention will hereinbelow be described in detail and thereafter be described in more detail with reference to the accompanying drawings.

In the present invention, as mentioned hereinbefore, a light transmitting means is employed between the surface of the stimulable phosphor and the photodetector. The light transmitting means, which will hereinbelow be referred to as "light guide member", should be made of a uniform material which is transparent to the light emitted from the stimulable phosphor. Further, the light guide member should be made of a material that can be finished to have a smooth surface so that the light transmitting therethrough may effectively be subjected to total reflection by the internal surface thereof.

As the material which can be processed as desired above and which has a property as described above, transparent thermoplastic synthetic resin such as acrylic resin, vinyl chloride resin, polycarbonate resin, polyester resin and epoxy resin, or glass can be used. Among these materials, quartz glass and acrylic resin are optically most preferred for the light emitted from the stimulable phosphor having the emission spectrum in the range of 300 to 500 nm. From the viewpoint of processing workability, acrylic resin or other synthetic resins are easy to work. Hence, acrylic resin is the most preferable material for the light guide member.

The light guide member should have such a shape that one end thereof extends along the scan line on the surface of the stimulable phosphor and the other end thereof is formed to match the light receiving face of a photodetector. Preferably, the end extending along the scan line is linear or arcuate. Since the scan line is normally linear, the end which extends along the surface of the stimulable phosphor is preferred to be linear. On the other hand, the other end which is formed to match the photodetector is preferred to be annular since the light receiving face of the photodetector like a photomultiplier is circular. The "annular" shape referred to in this specification means not only the exact annular shape like a complete circle but also the shape approximately regarded as annular shape for instance circle having a partially overlapped portion.

In order to effectively guide the light from the inlet to the outlet of the light guide member, it is necessary to enhance the probability of total reflection and prevent loss of light in the light guide member by selecting the shape thereof. In order to effect this, the shape of the light guide member is designed to be developed into a flat sheet having an almost uniform thickness and width over its length. Further, the surface of the light guide member should be processed to be considerably smooth. It has been proved by the instant inventors that a bulky light guide member which has the similar outer shape as the light guide member of the invention and has the inside filled with the same material cannot transmit the light with such high efficiency as the member made of a sheet. Therefore, it is preferred that the light guide member be made of a transparent sheet curled into a shape having a linear or arcuate inlet end and an annular outlet end.

Furthermore, in order to make the light transmission efficiency as high as possible, the curvature of the curled sheet should be made small so as not to interrupt the repeated total reflections. Consequently, the length of the sheet should be long enough to allow the small curvature. On the other hand, however, in order to make the amount of light received by the photodetector as much as possible, the number of total reflections is desired to be small and the absorption of light within the light guide member is desired to be decreased to most extent. For the purpose, the length of the sheet should be as short as possible. In order to meet these requirements, it is necessary to properly select the length and width of the light guide member or the sheet constituting the same. According to the investigation by the instant inventors, the above requirements can be met by selecting the ratio of the length (L) of the light guide member that is the shortest distance between its inlet and outlet to the width (W) of the light guide member that is the length of the linear end to extend along the scan line, i.e. L/W within the range of 0.4 to 1.5. The more desirable range of the ratio L/W is 0.5 to 1.0 for acrylic resin though it is not possible to generally determine the more desirable range for all the materials since it depends upon the sort of material.

The light collecting efficiency depends upon the solid angle at which the light emitting point of the phosphor plate faces to the light guide member. In order to increase the light collecting efficiency, the solid angle and therefore the thickness of the member should be as large as possible. However, if the thickness of the light guide member is too large, the cross sectional area of the light guide member at the outlet adjacent to the photodetector becomes too large to be received by the light receiving face of the photodetector. Therefore, the thickness of the light guide member is properly selected and the inlet end of the light guide member is located as close to the surface of the stimulable phosphor as possible in order to maximize the light collecting solid angle. Further, if the thickness of the light guide member is too large, it becomes difficult to work the sheet into the desired shape.

The above mentioned light guide member which should have the particular shape as desired can be obtained by heating and softening a thermoplastic sheet and shaping the sheet into the desired shape or by use of the well known mechanical process such as various type of pressing, casting or cutting works. However, the pressing, casting and cutting work are not good enough for obtaining a sufficiently smooth surface as required in this invention for effecting the total reflection. Further, because of the special shape of the light guide member, it is difficult to abrade the surface after rough working. Therefore, these mechanical processes are not suitable for obtaining the light guide member having a smooth surface and accordingly sufficient light guide efficiency. In addition, with these processes, there is a high possibility that internal strain will appear within the light guide member during the working process, which lowers the light guide efficiency. Thus, it is very difficult to make the light guide member with these processes.

Accordingly, as for the method of making the light guide member, the aforesaid method of heating and softening a thermoplastic sheet and shaping the sheet into the desired shape is the most preferable. Particularly, it is preferable to hold one end of a sheet between flat plates or the like while heating and softening the sheet and further to hold the other end in an annular shape and cool the sheet in its shape, and then to cut the both ends and abrade the both cut ends. The light guide member made by this method is free from internal strain and has a smooth surface effecting total reflection. When the material for making the light guide member is quartz glass, the softening point is so high that it is not easy to make the sheet by use of the above method. However, it has been proved that the light guide member can be basically made by use of the above method in this case too.

As for the photodetector to be used in this invention, it is desirable that the light receiving area is large and the S/N ratio is high since the light emitted from the phosphor is of very low intensity. As such a photodetector can be used a photomuliplier of head-on type or a photoamplifying channel plate.

As the stimulable phosphor to be used in this invention, it is desirable that the light emitted upon stimulation has a wavelength within the range of 300 to 500 nm. For example, rare earth activated alkaline earth methal fluorohalide phosphor is preferred. One example of this phosphor is, as shown in Japanese patent application No. 53(1978)-84742, a phosphor represented by the formula $(Ba_{l-x-y}, Mg_x, Ca_y)FX:aEu^{2+}$ wherein X is at least one of Cl and Br, x and y are numbers satisfying $0<x+y\leq0.6$ and $xy\neq0$, and a is a number satisfying $10^{-6}\leq a\leq 5\times 10^{-2}$. Another example of this phoshor is, as shown in Japanese patent application No. 53(1978)-84744 (U.S. Pat. No. 4,239,968), a phosphor represented by the formula $(Ba_{l-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leq x\leq0.6$, and y is a number satisfying $0\leq y\leq 0.2$. Further, as the stimulable phosphor to be used in this invention can be used ZnS:Cu,Pb; $BaO.xAl_2O_3$:Eu wherein $0.8\leq x\leq 10$; and $M^{II}O.xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5\leq x\leq 2.5$, as shown in Japanese patent application No. 53(1978)-84740. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in Japanese patent application No. 53(1978)-84743 (U.S. Pat. No. 4,236,078). Among the above numerated phosphors the rare earth activated alkaline earth metal fluorohalide phosphor is the most preferable, among which barium fluorohalides are the most preferable in view of the high intensity of emission of light.

Further, it is desirable to color the phosphor layer of the stimulable phosphor plate made of the above phosphor by use of pigments or dyes to improve the sharpness of the image obtained thereby as disclosed in Japanese patent application No. 54(1979)-71604, which corresponds to U.S. Pat. No. 4,394,581.

As for the stimulating rays for stimulating the phosphor after the phosphor is charged with the radiation energy in an image pattern, a laser beam having high directivity is used. As the laser beam, a laser having a wavelength within the range of 500 to 800 nm, preferably of 600 to 700 nm is preferred. For example, a He-Ne laser (633 nm) or a Kr laser (647 nm) can be used. If a color filter which cuts the light having a wavelength beyond the range of 500 to 800 nm is used together with a light source, a light source having a wavelength distribution beyond said range can be used.

The radiation image information read out by use of the device of this invention is used to reproduce a radiation image on a recording medium such as a silver halide photographic film, a diazo film or an electrophotographic recording material. Further, it is possible to reproduce the radiation image on a cathode ray tube.

In this invention, the stimulable phosphor plate is scanned with a laser beam. In order to scan a plate with a laser beam, there are two kinds of scanning method. In the first method, the laser beam is optically scanned in the primary direction and the phosphor plate is mechanically moved in the sub-scanning direction. In the second method, one of the laser beam and the phosphor plate is moved in both the primary scanning direction and the sub-scanning direction. In reading out the information using the invention, however, it is unnecessary to move the phosphor plate or the laser beam as in the second method since the light guide member has a light receiving end which extends along the primary scanning line of the laser beam and accordingly the mechanical movement may be made only in the sub-scanning direction. In other words, for example the phosphor plate may only be moved in the sub-scanning direction by a mechanical means or the laser beam may be moved only in the sub-scanning direction together with the light guide member.

The present invention will hereinbelow be described in detail with reference to several embodiments thereof referring to the accompanying drawings.

DESCRIPTION OF PREFERRED EMBODIMENTS

Figure 1A:
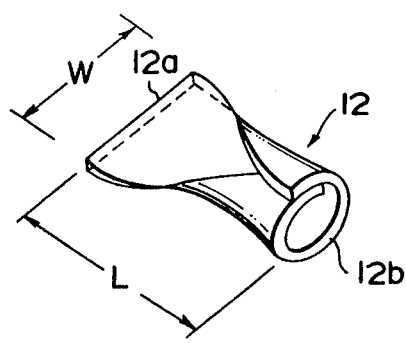
FIG. 1A is a perspective view of an example of the light guide member used in the present invention.
Figure 1B:
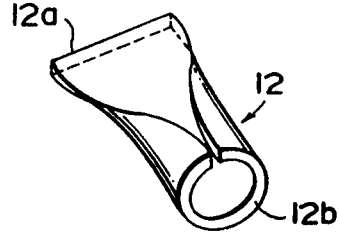
FIG. 1B is a perspective view of another example of the light guide member used in the present invention.

Referring to FIGS. 1A and 1B, a light guide member 12 has a linear end 12a and an annular end 12b as shown. In the example shown in FIG. 1A, the annular end 12b has an overlapped portion. In practical use, this overlapped portion does not affect the results considerably. It should be noted that this overlapping is often necessary to have the annular end 12b fitted to a small light receiving face of a photodetector. In the example shown in FIG. 1B, there is no overlapped portion at the annular end 12b. The length (L) and the width (W)

mentioned hereinbefore are shown in FIG. 1A. The light guide member 12 collects light at the inlet or linear end 12a and transmits the light to the outlet or annular end 12b repeating total reflections therein.

Figure 2:
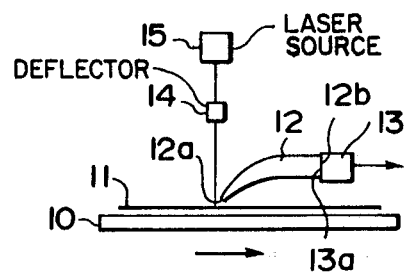
FIG. 2 is a schematic side view showing an embodiment of the radiation image information read out device of the present invention.

FIG. 2 shows an embodiment of the radiation image information read out device in accordance with this invention. A plate holder 10 movable in a horizontal plane advances a stimulable phosphor plate 11 in the sub-scanning direction indicated with an arrow. The stimulable phosphor plate 11 has a rectangular shape. A light guide member 12 having the shape as shown in FIG. 1A or 1B is provided above the stimulable phosphor plate 11 with its linear inlet 12a located adjacent to the primary scanning line of the laser beam on the surface of the stimulable phosphor 11 and with its annular outlet 12b connected with a light receiving face 13a of a photodetector 13. The stimulable phosphor plate 11 is made, for instance, by applying a BaFCl:Eu phosphor having a mean grain size of 10μ on a substrate of cellulose triacetate by use of nitro-cellulose into a dried thickness of 200μ.

A laser source 15 located above the phosphor plate 11 emits a red laser beam having a wavelength of 600 to 700 nm. The emitted red laser beam is deflected by a deflector 14 to scan the phosphor plate 11 mounted on the plate holder 10 to stimulate the phosphor layer of the phosphor plate 11. Being stimulated, the phosphor layer emits light in accordance with the radiation energy stored therein by exposure to X-rays. Thus, the X-ray image information stored in the phosphor plate 11 is converted into information carried by the light emitted thereby.

By advancing the plate holder 10 in the direction indicated by the arrow and scanning the laser beam in the primary scanning direction perpendicular to this direction, the phosphor plate 11 is scanned 2-dimensionally. The light emitted by the phosphor plate 11 upon stimulation by the laser beam enters the light guide member 12 through its inlet 12a and transmits therethrough being total reflected up to its outlet 12b and enters the light receiving face 13a of the photodetector 13, whereby the light is converted to an electric signal.

The electric signal thus obtained represents the X-ray image information and is used to control a recording laser beam modulator to modulate a recording laser beam and record or reproduce the X-ray image on a recording medium like a photographic film.

The photodetector 13 used here should have sensitivity only to the light emitted from the stimulable phosphor plate 1 and not to the stimulating rays, or it should be used in combination with a color filter which only transmits the light emitted from the stimulable phosphor plate 11 to selectively detect only the light emitted from the phosphor upon stimulation.

Figure 3:
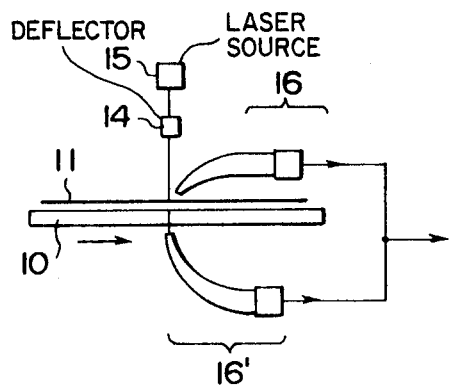
FIGS. 3 and 4 are schematic side views showing other embodiments of the radiation image information read out device of the present invention in which a pair of light guide members are employed.

FIG. 3 shows another embodiment of the present invention in which the light emitted upon stimulation is detected on both sides of the stimulable phosphor plate 11. In this embodiment, the substrate of the phosphor plate 11 and the plate holder 10 are made transparent to transmits the light emitted from the phosphor plate 11. A pair of detecting systems 16 and 16' are provided on both sides of the plate holder 10. One detecting system 16 consisting of a light guide member and a photodetector detects the light emitted from the upper surface of the phosphor plate 11 and the other detecting system 16' consisting of the same elements detects the light emitted from the lower surface of the phosphor plate 11. The inlet of the light guide member of the detecting system 16' located on the opposite side of the holder 10 with respect to the laser scanning system consisting of a laser source 15 and a deflector 14 can be located immediately under the scan line of the phosphor plate 11 as shown in FIG. 3. In this embodiment, since there are used two detecting systems 16 and 16', the light collecting efficiency is enhanced and the S/N ratio is improved.

Figure 4:
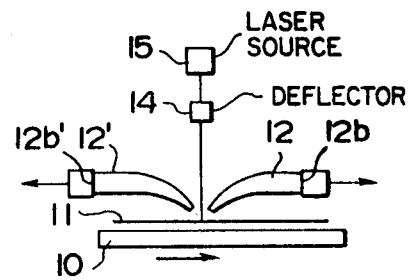

FIG. 4 shows another embodiment of the present invention in which a pair of detecting systems are located on one side of the stimulable phosphor plate 11. Referring to FIG. 4, a pair of light guide members 12 and 12' are located on opposite sides of the scan line on the same side of the phosphor plate 11 with a space formed therebetween for allowing a scanning laser beam to impinge upon and scan the phosphor plate 11. By use of the pair of light guide members 12 and 12', it is possible to catch more light emitted from the phosphor plate 11 and diverged to all directions and accordingly the light collecting efficiency can be enhanced. In this case, the outlet 12b of one light guide member 12 and the outlet 12b' of the other may be connected to a common photodetector or to separate photodetectors as shown in the drawing. When the separate photodetectors are used, the outputs of the photodetectors may be combined together by simply summing the output signals.

Figure 5:
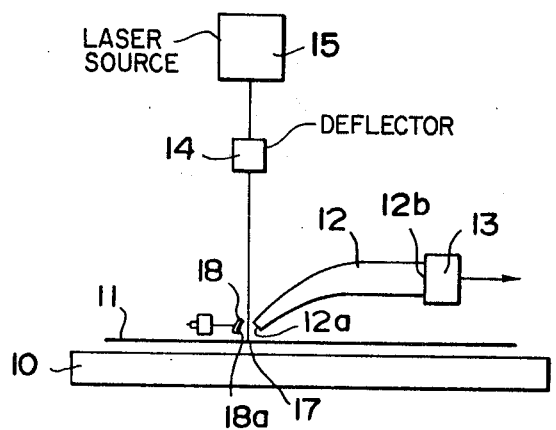
FIG. 5 is a schematic side view showing another embodiment of the radiation image information read out device of the present invention in which a mirror is employed in the place of one light guide member.
Figure 6:
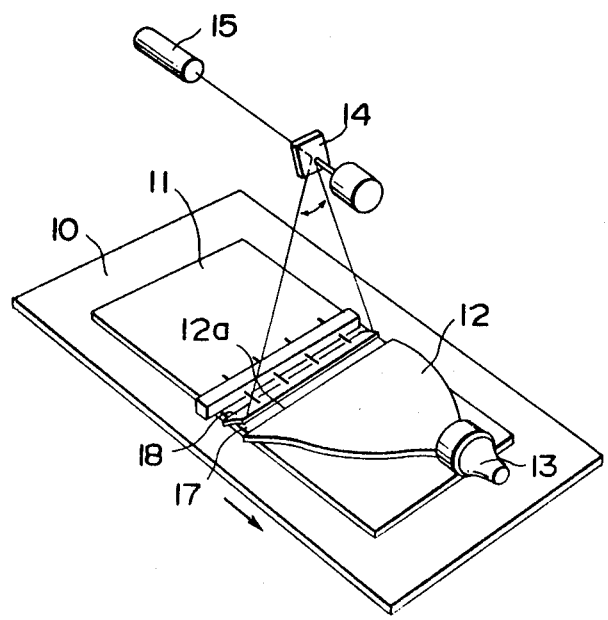
FIG. 6 is a perspective view showing the embodiment as shown in FIG. 5, FIGS. 7 and 8 are enlarged fragmentary side views showing examples of the mirror employed in the embodiment as shown in FIGS. 5 and 6.
Figure 7:
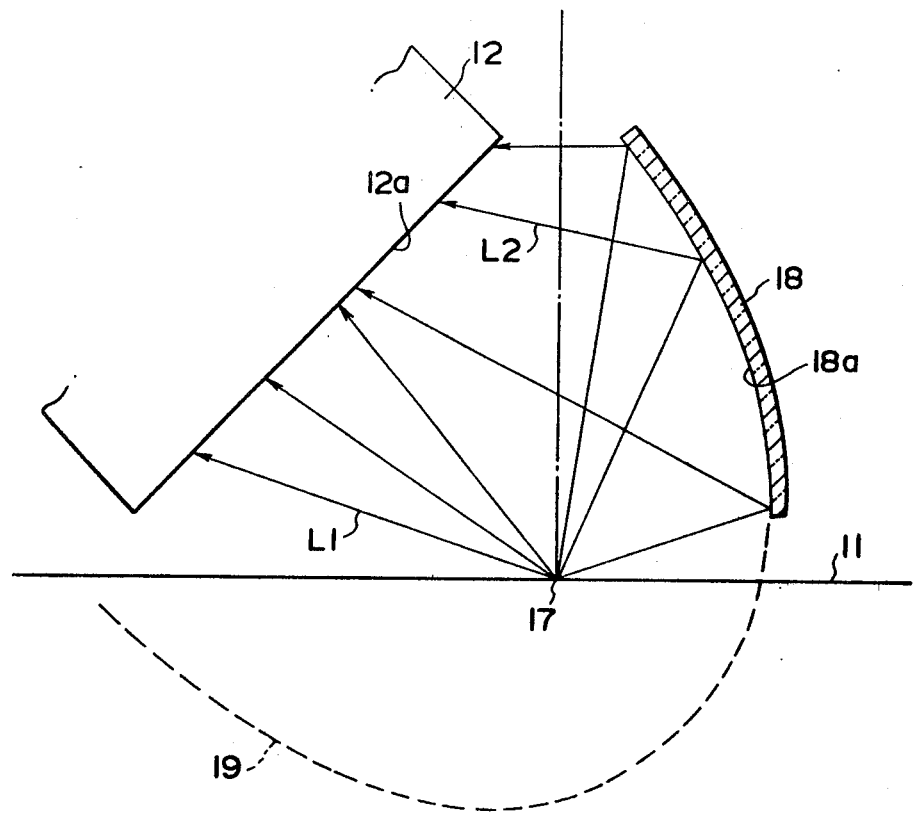
Figure 8:
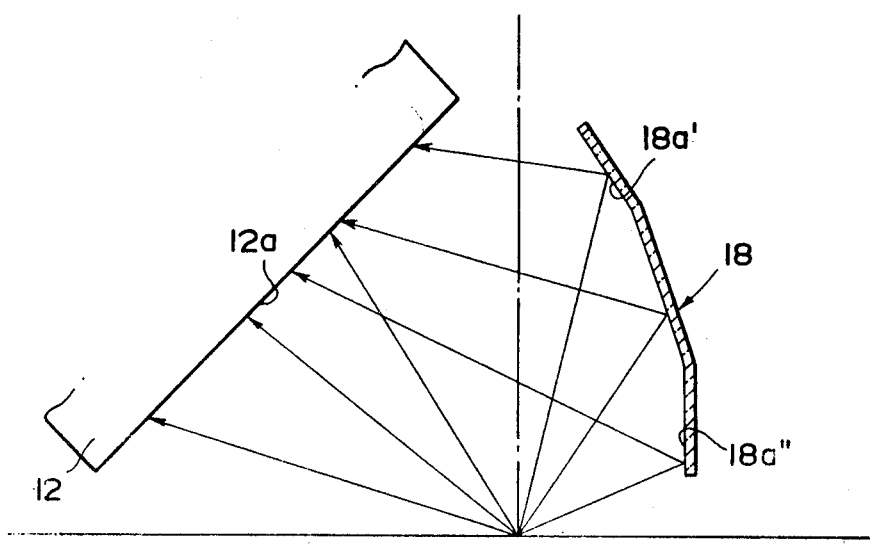
Figure 9:
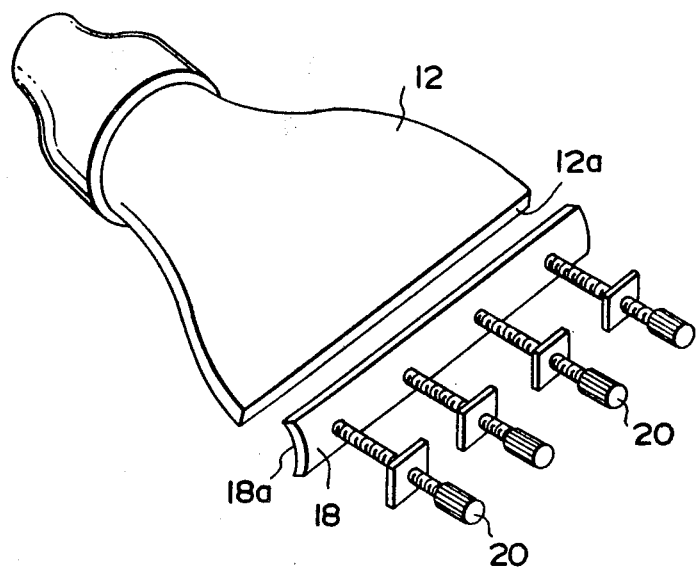
FIG. 9 is an enlarged perspective view showing the structure of the angle adjusting means for the mirror employed in the embodiment as shown in FIGS. 5 and 6.

FIGS. 5 and 6 show a still another embodiment of the present invention in which a mirror is used for enhancing the light collecting efficiency. Referring to FIGS. 5 and 6, an elongated mirror 18 is located in front of the linear inlet 12a of the light guide member 12 with a scan line 17 of the phosphor plate 11 positioned therebetween so that the reflecting face 18a of the mirror 18 faces to the inlet 12a to reflect a part of the emitted light toward the inlet 12a. The elongated mirror 18 has almost the same length as that of the linear inlet 12a of the light guide member 12. The mirror 18 is made for instance by vacuum evaporating aluminium or silver on a substrate. The structure or shape of the mirror 18 and the reflecting surface 18a is shown in FIGS. 7, 8 and 9 in detail. As shown in FIG. 7, the reflecting surface 18a of the mirror 18 receives almost all the light L2 other than the light L1 directly received by the inlet 12a of the light guide member 12 among the light emitted from the phosphor plate 11 at the scan line 17, and reflects the received light L2 to the inlet 12a. In order to effectively carry out this function the reflecting surface 18a of the mirror 18 has a non-linear cross-section in a vertical plane as shown in FIGS. 7 and 8. The non-linear cross-section is further desired to be in the form of a part of an ellipse 19 having its focal point at the scan line 17 as shown in FIG. 7. This may be a part of a parabola. In practical use, however, this may not be exactly an ellipse or parabola if the reflecting efficiency or light collecting efficiency is sufficient. For example, the reflecting surface 18a may be composed of three reflecting surfaces as shown in FIG. 8. The three reflecting surfaces have the central flat portion, and the upper and lower inclined portions 18a' and 18a" connected therewith. The three reflecting surfaces function as a whole like a curved surface to effectively reflect the received light to the inlet 12a of the light guide member 12. In this case, the reflecting surface portions 18a' and 18a" are both parallel to the scan line 17 and inclined with respect to each other. The number of the reflecting surface portions like said portions 18a' and 18a" may be properly selected, which may be two in all. In other words, the reflecting surface may only be composed of two inclined surfaces whereas the example shown in FIG. 8 has three portions in all. On the other hand, however, it should be noted that the reflecting surfaces of this type absorbs the light to some extent, and accordingly the number of reflections thereby should preferably be only one.

Although the elongated mirror 18 may be fixed at a predetermined position, in order to compensate variation of the light collecting efficiency along the scanning line it is desirable that an adjusting means be mounted to finely adjust the angle and/or distance by use of adjusting screws 20 as shown in FIG. 9.

By use of the elongated mirror 18, the light collecting efficiency can easily be enhanced without using a pair of light guide members. This is economically preferred as compared with the embodiment using a pair of light guide members as shown in FIGS. 3 and 4.

The light guide member 12 employed in the present invention can be made by heating and shaping a thermoplastic transparent material as of acrylic resin. One of the processes for making the light guide member in such a way will hereinbelow be described with reference to FIG. 10.

At first, an acrylic resin plate the surface of which is finished to have sufficient smoothness is cut into an acrylic resin plate 21 having a predetermined size. The opposite ends 21a and 21b of the acrylic resin plate 21 is abraded and finished to a mirror surface.

Then, the outlet side end corners are cut away to form a triangular end for facilitating the bending process.

The other end of the acrylic plate 21 is sandwiched between a pair of clamp plates 22a and 22b which constitute a holder 23. The internal surface of the holder is mirror finished and applied with a releasing agent. After the acrylic resin plate is also applied with a releasing agent the acrylic resin plate 21 is sandwiched by the holder 23 to maintain the inlet side end in the shape to fit to the scan line of the laser beam, that is linear or arcuate during a heating process.

The acrylic resin plate 21 is heated in an oven for about 25 to 30 minutes at a temperature of about 160° C. together with the holder 23.

The heated acrylic resin plate 21 is taken out of the oven and the outlet side end of the plate 21 is rounded by use of hands before cooled and hardened with the holder 23 held by hands of another worker.

After the outlet side end is rounded, the rounded end is inserted into a shaping jig 24 and naturally cooled and hardened. The jig 24 is made of a box having a hole on the top thereof which is provided with a ring 25 mounted thereon. The box is further provided with a pair of support arms 26 on the opposite sides thereof to receive said holder 23 in their receiving notches 26a as shown. With the lower end or the outlet side end of the resin plate 21 inserted into the ring 25 of the box and with the holder 23 held upside, the resin plate 21 is cooled at a room temperature. At this stage, the resin plate 21 is in contact only with the holder 23 and the ring 25 and all the remaining part thereof is set free in air. Since the cooling is a natural cooling, there is formed no internal strain in the resin plate.

After a long time cooling, the acrylic resin plate 21 is removed from the shaping jig 24 and the holder 23 is removed from the resin plate 21.

Then, the inlet side end of the resin plate 21 is set in another jig 27 and cut with a cutter blade 28 of a shaper. After the cutting, the cut surface of the inlet side end 21c of the resin plate 21 is abraded with a sand paper 30 attached to a wood block 29 for 30 minutes.

Furthermore, the abraded surface 21c is more finely abraded by use of abrasive of alumina and a sander 33 made by a cloth of velvet 32 attached to a wood block 31. The alumina particles should preferably have a grain size of $0.3\mu$ in the first step of abrasion and then alumina particles having a grain size of $0.05\mu$ are used to sufficiently abrade the surface in the second step of abrasion.

After the abrasion steps, the outlet side end is cut with a saw 34.

Then, the outlet side end face is abraded with a sand paper 36 attached on a flat wood plate 35 with the resin plate 21 covered with a protective cover which is not shown in the drawing for about 1 hour.

Finally, the abraded surface of the outlet side end is further abraded by use of an abrasive of alumina with a velvet 38 attached on a flat wood plate 37. Thus, the outlet side end face is mirror finished.

Thus, a light guide member 21 having mirror finished ends can be obtained.

It should be noted that the above mentioned process is one of the processes for making a light guide member which can be used in the present invention and there may be other processes or variations of the above process to obtain the desired light guide member that can be employed in the present invention.

Figure 10:
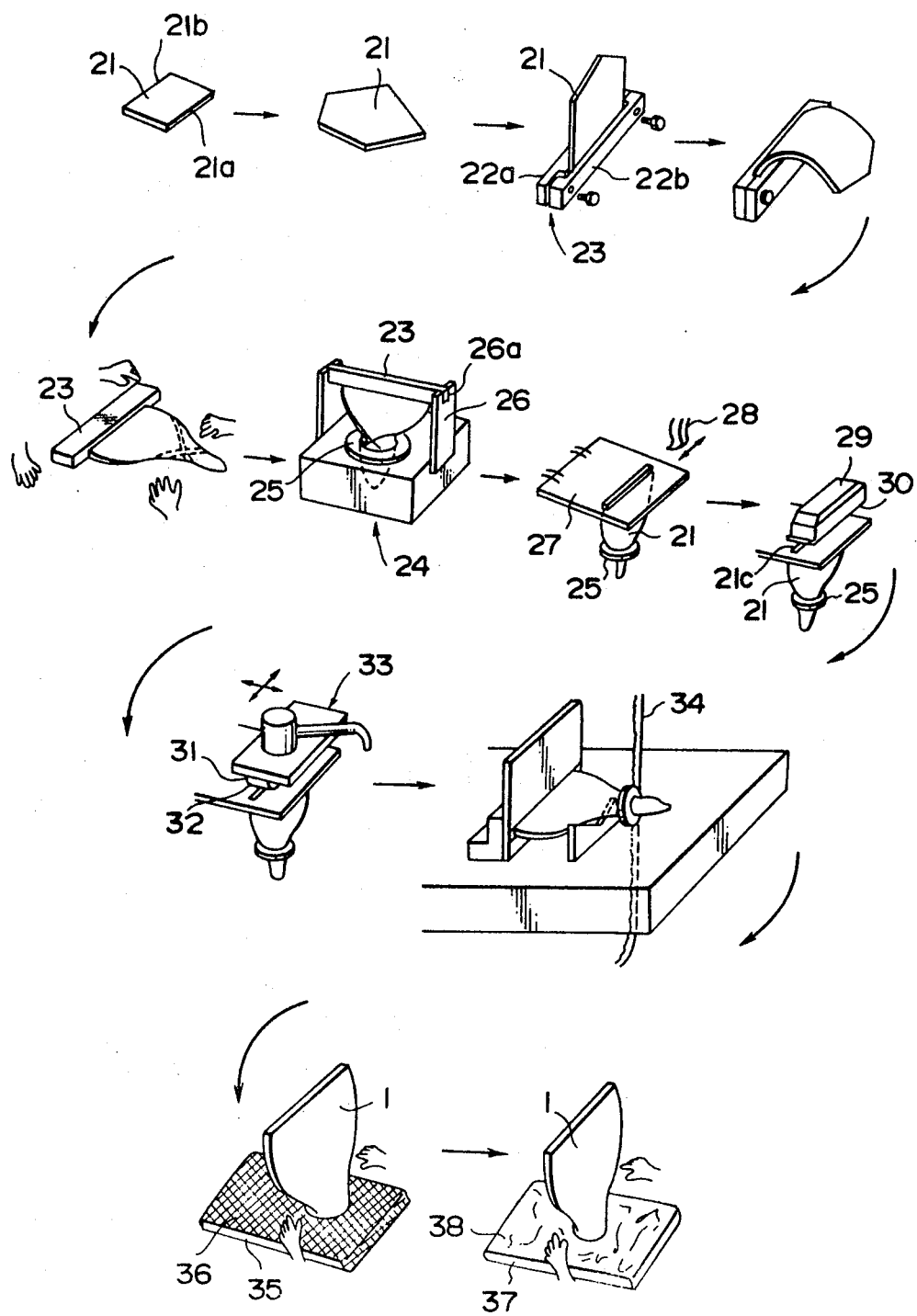
FIG. 10 is an explanatory view showing the steps of a process of making the light guide member employed in the present invention.

In the above described process as shown in FIG. 10, the resin plate 21 is cooled with its holder 23 supported upside. However, it will be noted that the holder 23 may be located at a lower position during the cooling step. Further, in the heating step, the holder 23 located at a lower position in FIG. 10 may be located at a higher position. Or, it will be possible to heat and cool the resin plate 21 in a horizontal position. Further, the heating temperature may not be limited to the above mentioned one but may be selected properly above the softening point of the resin plate. The heating time can also be selected properly.

Besides, it will also be appreciated that the resin plate may be handled by a mechanical means when it is taken out of the oven or rounded to form an annular end. The size of the resin plate can also be properly selected according to the size of the stimulable phosphor plate. The cooling step may not be of natural cooling type but may be controlled so as to be gradually cooled down from 80° C. for instance.

It should also be noted that the present invention can be carried out in various types of embodiments other than the embodiments described hereinabove.

For instance, the stimulable phosphor plate which has been described as a flat member can be flexible and mounted on a drum or the like. The drum can be rotated for sub-scanning of the phosphor plate with the primary scanning of laser beam.

Further, in the above-described embodiments a red laser beam having a wavelength within the range of 600 to 700 nm is used as a stimulating ray and a BaFCl:Eu phosphor which emits light of the wavelength within the range of 300 to 500 nm is used as a stimulable phosphor to clearly separate the stimulating rays and the light emitted by the phosphor and enhance the S/N ratio. It will be possible, however, to use a stimulable phosphor which emits light having a wavelength distribution overlapping with the wavelength of the stimulating rays by employing a color filter in front of the photodetector which cuts the wavelength of the stimulating rays and only transmits the light emitted from the phosphor. The color filter can be provided either on the inlet end 12a or on the outlet end 12b of the light guide member 12. Further, it will be possible to color the light guide member 12 itself to effect the wavelength cutting. The color filter can be applied on the end face of the light guide member by vacuum evaporation. Further, it will also be possible in such a case to use a photodetector which has sensitivity only to the light emitted from the phosphor.

In case that there is a difference in light collecting efficiency in the direction of the primary scanning due to variations in light transmission efficiency of the light guide member, it is desirable to cancel the difference by so processing the output signal of the photodetector by use of a memory means or the like that memorizes in advance the variations and compensates for the variations utilizing a known art as disclosed in Journal of the S.M.P.T.E. vol. 87, 1978, pages 209–213.

In accordance with the present invention, the light emitted from the stimulable phosphor having a very low intensity can be effectively collected by use of the light guided member and further effectively introduced into the photodetector. Consequently, the light collecting efficiency is markedly enhanced and the S/N ratio is considerably improved. Further, the size of the read out device is remarkably reduced and the manufacturing cost is materially lowered.

Now the present invention will be described in further detail with reference to several examples thereof.

EXAMPLE I

A pair of light guide members made of acrylic resin having a thickness of 5 mm, a width of 200 mm and a length of 300 mm were provided on the opposite sides of a scan line on the same side of a stimulable phosphor plate 11 held on a holder 10 as shown in FIG. 4. The annular outlet ends of the light guide members were shaped to be connected with the light receiving face of 3 inch photomultipliers. As the stimulable phosphor plate mounted on the holder a square plate having a dimension of 200mm×200 mm bearing a stimulable phosphor layer of BaFCl:Eu was used. As the laser source was used a He–Ne laser (633 nm) having an output power of 10 mW.

The laser beam was caused to scan the stimulable phosphor plate by use of a scanning mirror and the light emitted from the phosphor upon stimulation was detected by use of 3 inch head-on type photomultipliers having a spectral sensitivity of S-11 type. In front of the photomultipliers were provided color filters which has transmittivity of 0.01% for the light of the wavelength of 633 nm and of 80% for the light of the wavelength of 400 nm.

As a result, substantially 80% of the light emitted from the stimulable phosphor was collected and substantially 90% of the collected light was introduced into the photodetector. The S/N ratio was thus increased to more than twice as high as the S/N ratio of the conventional device.

EXAMPLE II

An acrylic resin sheet having a thickness of 5 mm and another sheet having a thickness of 8 mm (made by Mitsubishi Rayon Co., Ltd. "Acrylite #000") were heated and softened to make light guide members having a width at the inlet side end of 200 mm and 380 mm respectively. The inlet side end of both the samples of the light guide member was made linear and the outlet side end was made annular. In the sheet having the 200 mm end, the annular end was shaped to be connected with the light receiving face of a 3 inch photomultiplier, and in the sheet having the 380 mm end, the annular end was shaped to be connected with the light receiving face of a 5 inch photo- multiplier.

Figure 11:
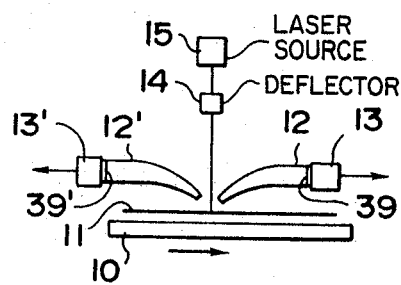
FIG. 11 is a schematic side view showing still another embodiment of the radiation image information read out device of the present invention in which a color filter is employed in front of the photodetectors.
Figure 12:
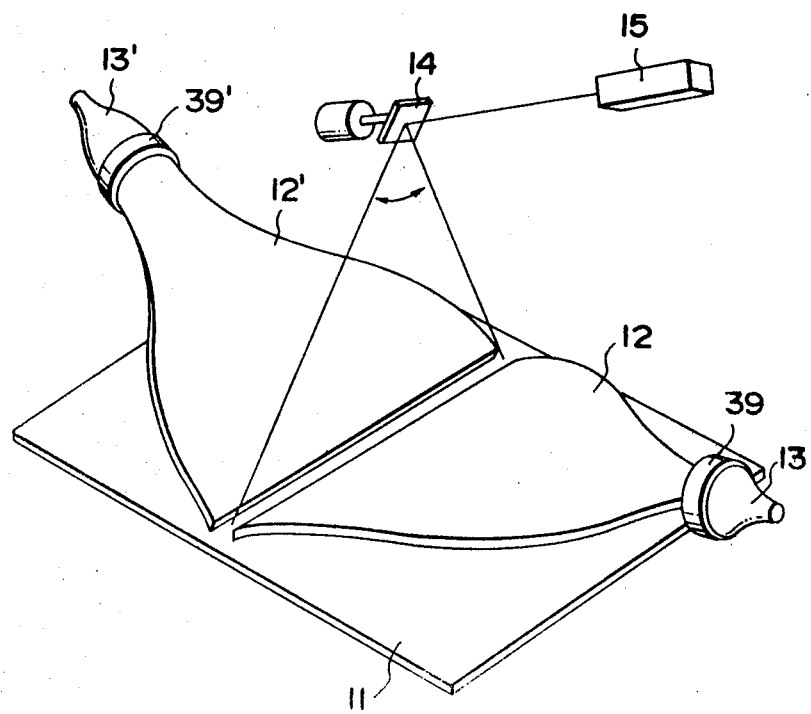
FIG. 12 is a perspective view showing the embodiment as shown in FIG. 11.

The light collecting efficiency was measured by use of the above light guide members in a radiation image information read out device as shown in FIGS. 11 and 12.

As the stimulable phosphor plate 11 placed on the holder 10 a rectangular plate having a dimension of 356 mm×430 mm carrying a stimulable phosphor layer of BaFBr:Eu. As the laser source was used a He–Ne laser (633 nm) having an output power of 10 mV.

The laser beam was caused to scan the stimulable phosphor plate by use of a scanning mirror 14 and the light emitted by the phosphor upon stimulation was detected by use of a pair of photomultipliers 13 and 13'; having a spectral sensitivity of S-11 type by way of the pair of light guide members 12 and 12'. In front of the photomultipliers 13 and 13' color filters 39 and 39' having transmittivity of 0.01% for the light of the wavelength of 633 nm and 80% for 400 nm were provided to selectively transmit the light emitted from the phosphor plate 11.

Figure 13:
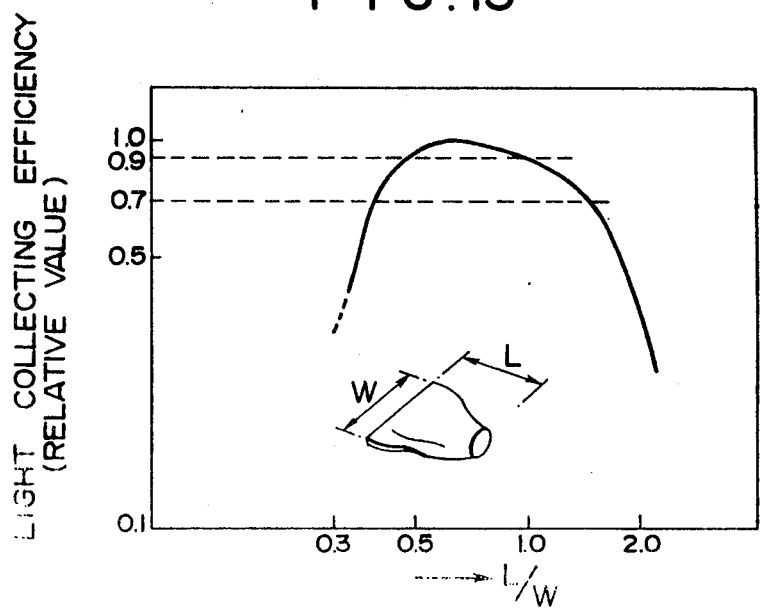
FIG. 13 is a graph showing the relationship between the light collecting efficiency and the ratio of the length (L) to the width (W) of the light guide member employed in the present invention.

The results thus obtained are shown in FIG. 13. FIG. 13 shows the light collecting efficiency resulting from the light guide member employed in the present invention as a function of the ratio of the length (L) to the width (W) of the light guide member employed. The light collecting efficiency was measured in terms of the output power of the photomultiplier. There was observed no significant difference in the light collecting efficiency between the light guide members having the different thicknesses.

As shown in FIG. 13, the light collecting efficiency was over 70% within the range of 0.4 to 1.5 of the ratio L/W and over 90% within the range of 0.5 to 1.0 of the ratio L/W.

EXAMPLE III

An acrylic resin sheet having a thickness of 5 mm as used in EXAMPLE II was used to make a light guide member having an inlet end of 200 mm long. The outlet end was formed into an annular shape adapted to be connected with a light receiving face of a 3 inch photomultiplier.

The light guide member thus obtained was used in a radiation image information read out device as shown in FIGS. 5 and 6 in which a mirror was used in combination with the light guide member to enhance the light collecting efficiency. As the mirror was used an elongated mirror having a reflecting surface made by aluminium vacuum evaporation which is curved in an ellipse shape in cross-section. The effective reflectivity was about 92.5% for the light emitted by the phosphor.

As the stimulable phosphor plate mounted on the holder was used a square plate having a dimension of 200 mm×200 mm bearing a stimulable phosphor layer of BaFBr:Eu. As the laser source was used a He–Ne laser (633nm) having an output power of 10 mV.

The laser beam was caused to scan the stimulable phosphor plate 11 by use of a scanning mirror 14 and the light emitted by the phosphor upon stimulation was collected on one hand by the light guide member 12 and on the other hand reflected by the mirror 18 toward the light guide member 12 so as to effectively collect the emitted light. The light collected by the light guide member 12 finally was detected by a photomultiplier 13 of 3 inch head-on type having the spectral sensitivity of S-11 type. In front of the photomultiplier 13 a color filter having transmittivity of 0.01% for the light of wavelength of 633 nm and 80% for 400 nm was provided to selectively transmit the light emitted by the phosphor plate 11.

As a result, the light collecting efficiency was increased up to about 1.8 to 1.85 times as high as that of the device employing only one light guide member and no mirror. This result was only slightly lower than the light collecting efficiency of the device employing a pair of light guide members in which the light collecting efficiency was doubled.

We claim:

1. A radiation image informtion read out device for reading out radiation image informtion recorded on a stimulable phospor plate by scanning the stimulable phosphor plate wtih a stimulating ray comprising in combination a photodetector for detecting the light emitted by the stimulable phosphor plate upon stimulation of the stimulable phosphor, and a light guide member provided between the photodetector and the stimulable phospor plate for transmitting the light emitted by the stimulable phosphor plate to the photodetector, said light guide member being made of a light transmitting sheet material one end of which is located adjacent to a scan line on the stimulable phosphor plate and the other of which is located adjacent to the light receiving face of the photodetector and shaped to be adapted to be adjacent to the light receiving face wherein said end to be located adjacent to the scan line is shaped into a linear form and the other to be located adjacent to the light receiving face of the photodetector is shaped into an annular form to be adapted for the light receiving face of the photodetector.

2. A radiation image information read out device as claimed in claim 1 wherein said light transmitting sheet material is made of a transparent thermoplastic synthetic resin which transmits light of the wavelength of 300 to 500 nm.

3. A device as claimed in claim 2 wherein said light guide member is produced by heating and softening a transparent thermoplastic synthetic resin with one end thereof held in the shape to fit to the scan line, cooling the same with the other end thereof held in an annular shape, and abrading both the ends.

4. A device as claimed in claim 3 wherein said transparent thermoplastic synthetic resin is cooled with the other end thereof engaged with a jig in the form of a ring.

5. A device as claimed in claims 2, 3, or 4 wherein said transparent thermoplastic synthetic resin is acrylic resin.

6. A device as claimed in claim 5 wherein the ratio of a length from said one end to the other of the light guide member to a width of the end to be located adjacent to the scan line is within the range of 0.5 to 1.0.

7. A device as claimed in claim 2 wherein a pair of said light guide members are located oppositely to each other with the scan line position therebetween.

8. A device as claimed in claim 2 wherein a light reflecting means having substantially the same length as that of the end adjacent to the scan line is provided opposite to the light guide member with the scan line positioned between the reflecting means and the light guide member for receiving almost all the light emitted by the stimulable phosphor plate other than the light directly received by the end of the light guide member and reflecting the received light toward the end of the light guide member located adjacent to the scan line, said light reflecting means having a non-linear cross section in a vertical plane and being separated from the light guide member to make a space between the means and the light guide member to allow said stimulating ray to impinge upon the stimulable phosphor plate passing through the space.

9. A device as claimed in claim 8 wherein the nonlinear cross section is in the form of a part of an ellipse having its focal point at the scan line.

10. A device as claimed in claim 8 wherein said light reflecting means is a mirror having at least two reflecting flat faces which are in parallel to the scan line and are inclined at an angle with respect to each other.

11. A device as claimed in claims 8, 9 or 10 wherein said reflecting means is provided with an adjusting means for adjusting the angle of the reflecting means with respect to the light receiving face of the end of the light guide member located adjacent to the scan line and/or the distance between the light reflecting means and the light guide member.

* * * * *